June 6, 1950     J. A. BRADLEY     2,510,373
METERING INJECTOR FOR PRESSURE LINES
Filed Jan. 24, 1947     2 Sheets-Sheet 1
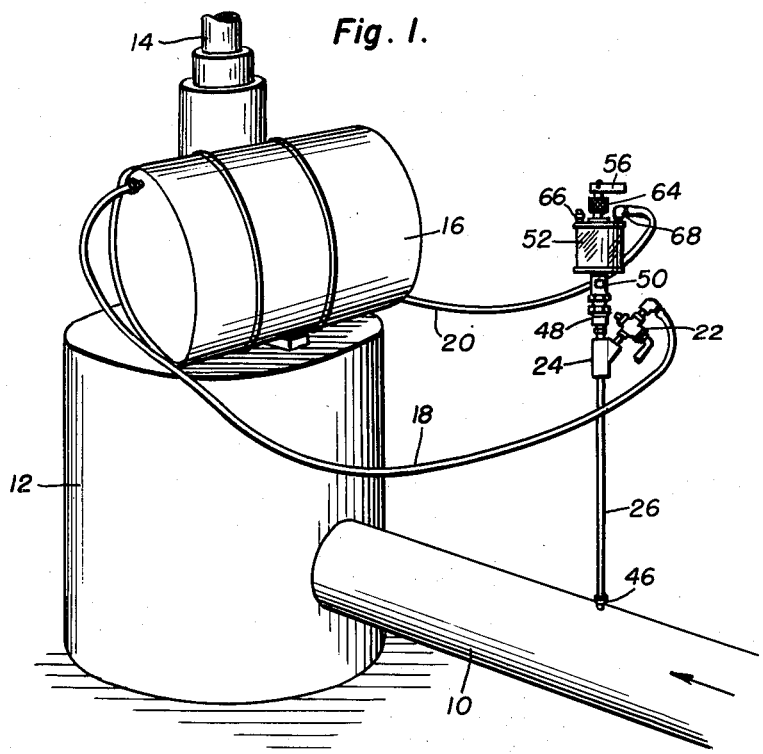
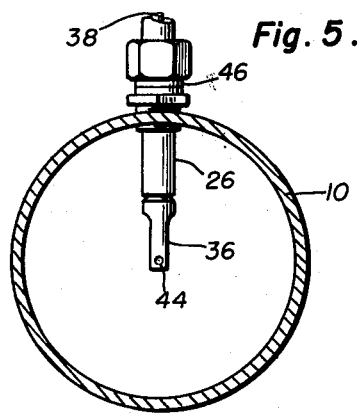
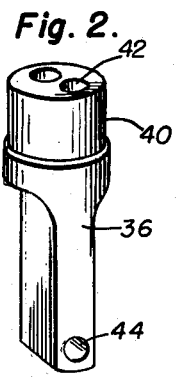
Inventor
John A. Bradley
By *Clarence A. O'Brien and Harvey B. Jacobson*
Attorneys June 6, 1950  J. A. BRADLEY  2,510,373
METERING INJECTOR FOR PRESSURE LINES
Filed Jan. 24, 1947  2 Sheets-Sheet 2

*Inventor*
John A. Bradley

By Clarence A. O'Brien
and Harvey B. Jacobson
*Attorneys*

Patented June 6, 1950

2,510,373

UNITED STATES PATENT OFFICE 2,510,373

METERING INJECTOR FOR PRESSURE LINES

John A. Bradley, Santa Ana, Calif.

Application January 24, 1947, Serial No. 724,017

5 Claims. (Cl. 47—1)

This invention relates generally to injectors, and more particularly to a metering injector for injecting a liquid into another liquid flowing in a pipe under pressure and operating on the Pitot tube principle, the device being adapted for use with fluids of light viscosity and also for gases.

It will be understood that this invention is not limited to use with fluids having a higher specific gravity than the fluid flowing in the pipe, but when the fluid to be mixed with the flowing fluid has a higher specific gravity advantage is taken of this circumstance, as hereinafter described.

This invention was first developed for use with irrigation systems and in that particular case the second fluid is a water solution of certain scientifically determined chemicals used to correct alkalinity or acidity of the irrigation water and to add scientifically mixed liquid fertilizers, and in this case the specific gravity of the solution to be mixed with the irrigation water is, of course, greater than unity. Wherever irrigation by pumping from wells is practiced, some of the best wells are found at the lower land surface elevations of ground water basins and some of the better-crop producing lands are located at higher elevations. In order to irrigate these higher lands it is necessary to force the water through pipelines and it is preferable to inject the chemicals to be added to the irrigation water at the lower level, or close to the pressure pump, in order to achieve better mixing of the chemicals in the water prior to the discharge of the same on the land to be irrigated. Several methods have been developed to carry out the injection of chemicals into irrigation water, the essential feature of all such methods comprising means to overcome the internal pressure within the pipe and to properly meter the added chemical. These methods include the provision of a mechanical force pump, or the use of compressed air, the metering control in these cases being very difficult and the apparatus being, of course, relatively expensive. Another method of introducing the chemical into the pipes is to connect the container holding the dissolved chemical with the suction side of a centrifugal pump when such pump is used to force the water through the irrigation pipes, this method being, however, seldom applicable in actual practice. And a fourth method used prior to this invention utilizes venturi in the pipelines or in by-passes connected with these pipelines, but these Venturi meters, aside from being too expensive for general use, are generally not controllable to achieve a proper and constant burdening of the irrigation water with chemicals for different flow velocities, that is, the flow of the irrigation water through the pipe.

The present invention has been developed to overcome these objections and a primary object of this invention is to utilize Pitot tube principles whereby the pipeline need be apertured at one point only and a double tube, enclosed in a single sheath, inserted in said pipeline on the discharge side of a pressure pump.

Another object of this invention is to provide means for injecting a second fluid into a carrier fluid flowing within a pipe and under internal pressure, whenever said second fluid has a specific gravity substantially equal to or greater than the specific gravity of the carrier fluid.

Another object of this invention is to provide means for injecting a second fluid into a fluid flowing in a pipeline and providing for the controlled and variable metering of the added fluid, it being understood that in the normal application of this invention said fluid will be liquid.

Another object of this invention is to provide a device of this character which achieves not only perfect control of infinitesimal rates of injection but also accurate control of injection rates entailing the addition of large volumes of fluids to the carrier fluid; the device being adaptable for accurate field or laboratory measurement of such injection.

It is another object of this invention to provide for satisfactory mixing, partly due to the fact that the second fluid is injected close to the pressure pump and the mixed fluids travel a considerable distance through the lines prior to discharge upon the land to be irrigated, in the case of irrigation systems, and partly due to the existence of a burble or eddy immediately behind or downstream from the Pitot tube injector unit provided according to this invention.

It is another object of this invention to provide a device which is readily portable, easily applied to a pipeline, and easily removable therefrom requiring only a screwed plug to close the aperture in the pipeline after the device has been removed therefrom, and applicable directly to tanks and drums normally used for the transport of chemicals wherewith the carrier fluid is to be burdened.

Another object of this invention is to provide an injector system in which flow occurs entirely within a closed circuit, this flow becoming completely automatic in operation after proper initial setting, and requiring no outside power source of any character, the device including a sight-feed metering valve chamber to simplify the control of the rate of injection; in this connection, it should be noted that the air-lock existing initially in the system will be gradually dissipated and the rate of flow will be thus increased slightly as the level of the second fluid is reduced in the tank or drum container which will ordinarily be used, thus providing compensating variants leading toward more uniform flow. When the second fluid has a higher specific gravity than the carrier fluid a slight siphonic action will be induced after the air-lock in the system has been removed and this siphonic action also acts inversely to the action of said air-lock so that substantially uniform flow is maintained.

And a last object to be specifically mentioned is to provide a device of this character which is relatively inexpensive and completely practicable to manufacture, simple and convenient to install and use, and which is sufficiently sturdy to provide for generally efficient and durable service.

With these and other objects definitely in view, this invention resides in certain novel features of construction, combination and arrangement of parts and portions as will be hereinafter described in detail and particularly set forth in the appended claims, reference being had to the accompanying drawings which form a material part of this application, and in which:

Figure 1 is a perspective view of this invention operatively applied to a portion of an irrigation pipe system;

Figure 2 is an enlarged detail perspective view of the Pitot tube head which is secured within the pipe;

Figure 3:
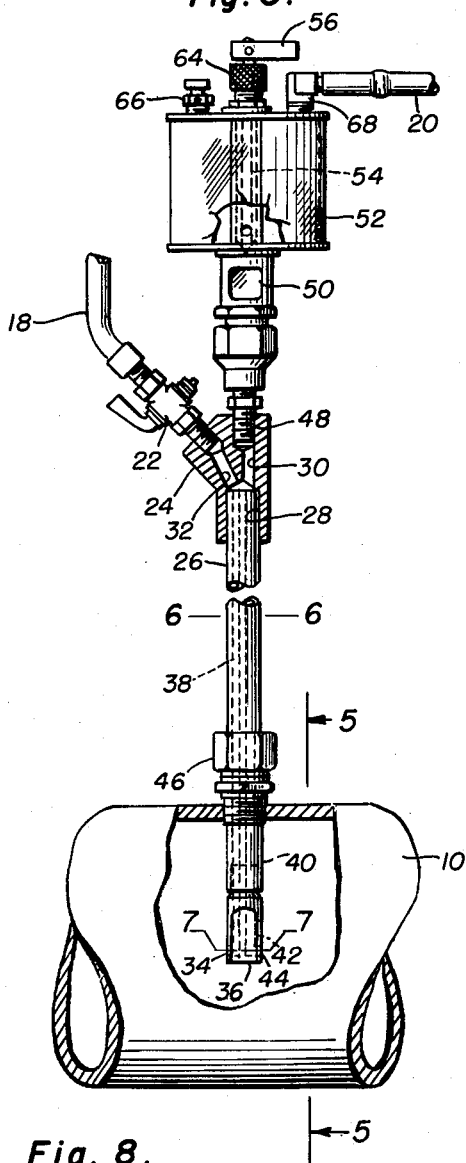
Figure 4:
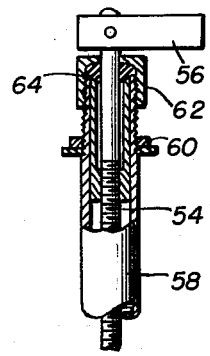
Figure 6:
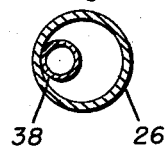
Figure 7:

Figure 3 in an enlarged view of a main portion of the invention operatively applied to a pipe, the view being fragmentary in character and partly in elevation and partly in vertical section, to facilitate the illustration of this invention and to amplify the disclosure thereof;

Figure 4 is a fragmentary detail view of the metering valve and contiguous structure;

Figure 5 is a vertical sectional view taken on the line 5—5 in Figure 3;

Figure 6 is a horizontal sectional view, taken on the line 6—6 in Figure 3;

Figure 7 is a horizontal sectional view, taken on the line 7—7 in Figure 3, and

Figure 8:
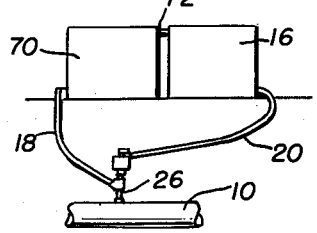

Figure 8 is a diagrammatic view, designed to illustrate how this invention is used with an empty drum connected with the drum containing the second fluid, when the carrier fluid and said second fluid are relatively highly diffusible.

Referring now to the drawings in detail, which drawings represent one preferred embodiment of this invention, it will be noted that the environment wherewith this invention is incorporated, as illustrative of the several uses to which this invention may be put, includes an irrigation pipe 10, an enclosed standpipe 12, and the lower portion of a riser pipe 14, the latter two elements being represented here merely as suggestive of convenient means for supporting the drum 16 which contains the liquid chemical required to be injected into the stream of water flowing in the direction of the arrow and under pressure within the pipe 10.

Two tubes 18 and 20 are used to connect the drum 16 to the injector, the tube 18 being secured at the top of the drum and the tube 20 being secured at the lower edge of the drum, as illustrated. The tube 18 is provided with a stop valve 22 which is threadably secured to a molded fitting 24, which fitting is adapted to be pressed onto the upper end of a sheath 26 and is formed with Y-shaped channels 28, 30 and 32, the hollow sheath 26 occupying the channel 28 as stated above. A Saran tube or any other tube of semirigid and chemically resistant character, extends upwardly from the orifice 34 in the tip-piece 36, through the length of the sheath 26 and through the channel 32 to communicate with the valve 22, as indicated at 38, the ends of the tube 38 being secured to the fitting 24 and the tip-piece 36 by Lucite cement or other suitable means. The said tip-piece 36 is preferably formed with a reduced neck portion 40 and this tip-piece will also be constructed of chemically resistant material such as Lucite, and two longitudinally disposed channels are formed therein for the accommodation of the lower end of the Saran tube 38, the second channel 42 communicating with an orifice 44 diametrically oppositely disposed to the orifice 34 and the upper end of this channel 44 communicates with the interior of the sheath 26. A packing gland nut 46 is used to secure the sheath 26 in a knurled and tapped aperture to the pipe 10 so that this sheath 26 is supported in upright position on the upper side of the pipe. As noted above, this construction enables the satisfactory securement of the device in the irrigation pipe system by the mere provision of a single small aperture in the pipe, and the device is therefore very simple to install.

The channel 30 in the fitting 24 communicates with the attachment nipple 48 of sight-feed oiler-like chamber 50 and 52, which is provided with a threaded needle valve 54, having a manually controllable lever handle 56, this valve being mounted in an internal cylinder 58 secured to the chamber 52 by a nut 60, a gland nut 62 being threadably associated with the upper end of the cylinder 58, all as indicated best in Figure 4, packing 64 being provided in this gland nut 62 to provide for an airtight connection required to prevent seepage at this point.

In order that air imprisoned in the system when the device is initially placed in operation may be expelled, an air vent 66 is provided in the top of the chamber 52, and a threaded elbow nipple 68 is also operatively secured to the top of this chamber for the attachment of the flexible tube 20.

Many and various minor modifications in the exact shape, structural detail and proportions of the various elements of this invention may be resorted to and all such useful modifications are well within the scope and spirit of this invention. For example, the exact shaping of the tip-piece 36 is a matter of mechanical expediency and individual preferment, although it is preferred that the tip-piece should be reasonably narrow as well illustrated in Figure 2 and streamlined to some extent, in order not to present too great an obstacle to the flow of the fluid within the pipe 10. The operation of this device will be reasonably obvious from a consideration of the foregoing description of the mechanical details thereof, taken in connection with the recitation of the objects sought to be achieved thereby and the drawings, but it should be noted that the device is secured to the pipe 10 in such a manner that the orifice 34 is upstream or disposed to receive impact pressure which is additional to the pressure, that is static pressure, encountered at all points within the pipe 10. Since this differential pressure is well recognized in all applications of the Pitot tube principle it is thought unnecessary to attempt detailed explanation thereof in this specification, it being sufficient to point out that the pressure in the tube 18 will be considerably greater than the pressure in the tube 20 when the valves 22 and 54 are open. This differential in pressure will cause the liquid contained in the drum 16 to be displaced by a portion of the liquid flowing in the pipe 10, the displaced liquid being injected into the carrier fluid within the pipe 10, the outlet, of course, being through the orifice 44 in the tip-piece 36. In this connection, it may be noted that this injector will be so proportioned that the tip-piece 36 will be positioned substantially at the center of the pipe 10 because the flow velocity of the liquid therein is greatest at this point, and since the differential in pressure will be greatest when the velocity is greatest, it follows that the tip-piece should be placed at the center of the pipe.

When the specific gravity of the liquid contained in the drum 16 is greater than the specific gravity of the carrier liquid an additional head is obtained by fastening the tube 18 at the top of the drum 16 and securing the tube 20 at the bottom of said drum; in this manner, a siphonic action by reason of the heavier fluid being contained in one leg of the system will be utilized to ensure the operation of the injector even when the velocity of the carrier liquid is very low.

Finally, when the fluid in the drum 16 is readily diffusible in the carrier fluid, this diffusion may be lessened or obviated by provision of a second drum, illustrated at 70 in Figure 8, this second drum being empty, that is, filled with air, and the two drums will be connected together as at 72 at the tops thereof. In this manner, diffusion is prevented and pressure is transmitted from the drum 70 to the drum 16 through the medium of the air being gradually displaced by a portion of the carrier fluid entering the drum 70 through the tube 18. In all cases it is preferred that the drum 16 should be placed at a level higher than the level of the pipe 10 and in initiating the injection, after the tubes 18 and 20 have been secured to the drum 16 and the device has been secured to the pipe 10 by means of the gland nut 46, the metering valve 54 is opened to allow a predetermined flow of the liquid from the drum 16 into the sight-feed chamber 50 and the valve 22 is opened to allow the carrier fluid to enter the top of the drum 16 through the tube 18. The air vent 66 may be used to relieve an air-lock if this air-lock is sufficient to interfere with the proper functioning of the injector, and the device should be checked after a few moments of operation in order to see that elimination of this air-lock which will occur in the normal operation of the device has not made readjustment of the metering valve necessary. It has been found, however, that elimination of this air-lock is a very gradual procedure and tends to compensate for the gradual lowering of the level of the liquid in the drum 16, the result being that a substantially normal flow is obtained from the time the valves are first opened until the drum 16 is empty. When it is desired to stop operation of this injector, the valve 54 is closed before the shut-off valve 22 is closed, after which the tubes 18 and 20 may be removed, the gland nut 46 backed out of the pipe 10 and a screwed plug inserted therein.

Though there has been shown a particular embodiment of this invention, this application is not limited to this particular embodiment, but it is desired to include in the scope of this invention the construction, combination and arrangement of parts and portions substantially as set forth in the appended claims.

Having thus described this invention what is claimed as new and desired to be secured by Letters Patent is:

1. A portable injector for injecting a second fluid from a separately portable container into a fluid flowing in a pipe, including two tubes communicating with said container and said pipe, said tubes terminating in a tip-piece insertable in said pipe and having orifices angularly differently disposed with relation to the longitudinal axis of said pipe, whereby a pressure differential obtains in said tubes, the one of said tubes having the orifice within said pipe disposed so as to be subject to impact pressure communicating with the top of said container, and the other tube communicating with the bottom of said container, to lessen diffusion of the two liquids within the container and to utilize the additional pressure differential in the tubes due to siphonic action when said second fluid has a specific gravity higher than said flowing fluid, said one of said tubes having a stop valve incorporated therewith, and said other tube having a sight feed chamber initially filled with air when said container is full of said second fluid, and a metering valve incorporated with said chamber.

2. Means for injecting a second fluid into a fluid flowing in a pipe comprising a closed container for said second fluid and for a portion of said flowing fluid which displaces said second fluid, a Pitot tube construction including a dynamic pressure tube and a static pressure tube, said tubes individually communicating with the interior of said pipe and with said container, a metering valve in said static pressure tube, an enlarged chamber in said static pressure tube at said valve filled with air when said container is full and when the flow from said container is initiated, whereby an air lock of gradually diminishing effectiveness is provided to compensate for currently decreasing head in the container as the second fluid is exhausted from the container.

3. Means according to claim 2 for use with diffusible liquids, and in which said container is portable, a second air filled portable container, said containers communicating at the tops thereof, whereby said portion displaces air from said air filled container into the first mentioned container as the latter is evacuated of liquid.

4. Means according to claim 2 and wherein a portion of one of said tubes comprises a sheath for a portion of the other tube, said sheath having a tip-piece with diametrically oppositely disposed orifices communicating individually with said tubes and carried on an end of said sheath, said sheath having means for securing the same on said pipe with said tip-piece at the longitudinal center line of the pipe, said tubes being flexible throughout major portions of their lengths to facilitate securement thereof to the container.

5. Means according to claim 2 and wherein a portion of one of said tubes comprises a sheath for a portion of the other tube, said sheath having a tip-piece with diametrically oppositely disposed orifices communicating individually with said tubes and carried on an end of said sheath, said sheath having means for securing the same on said pipe with said tip-piece at the longitudinal center line of the pipe, said sheath comprising a continuation of said static pressure tube, and said portion of the other tube comprising a continuation of said dynamic pressure tube, said portion being of chemically resistant material, and said tip-piece and portion being removable from said sheath.

JOHN A. BRADLEY.

REFERENCES CITED

The following references are of record in the file of this patent:

UNITED STATES PATENTS

| Number | Name | Date |
|---|---|---|
| 445,909 | Shontz | Feb. 3, 1891 |
| 711,295 | Deare | Oct. 14, 1902 |
| 817,470 | Cole | Apr. 10, 1906 |
| 1,855,323 | Sirch | Apr. 26, 1932 |
| 2,058,309 | Haering | Oct. 20, 1936 |
| 2,064,627 | Paine | Dec. 15, 1936 |
| 2,240,648 | Hartman | May 6, 1941 |

FOREIGN PATENTS

| Number | Country | Date |
|---|---|---|
| 609,565 | France | Aug. 17, 1926 |
| 260,279 | Germany | May 23, 1913 |
| 251,826 | Great Britain | May 13, 1926 |